INVENTORS
RICHARD L. LEWIS
CHARLES M. BARNES
DONALD W. SMITH
BY- Sheldon F. Raizes
ATTORNEY

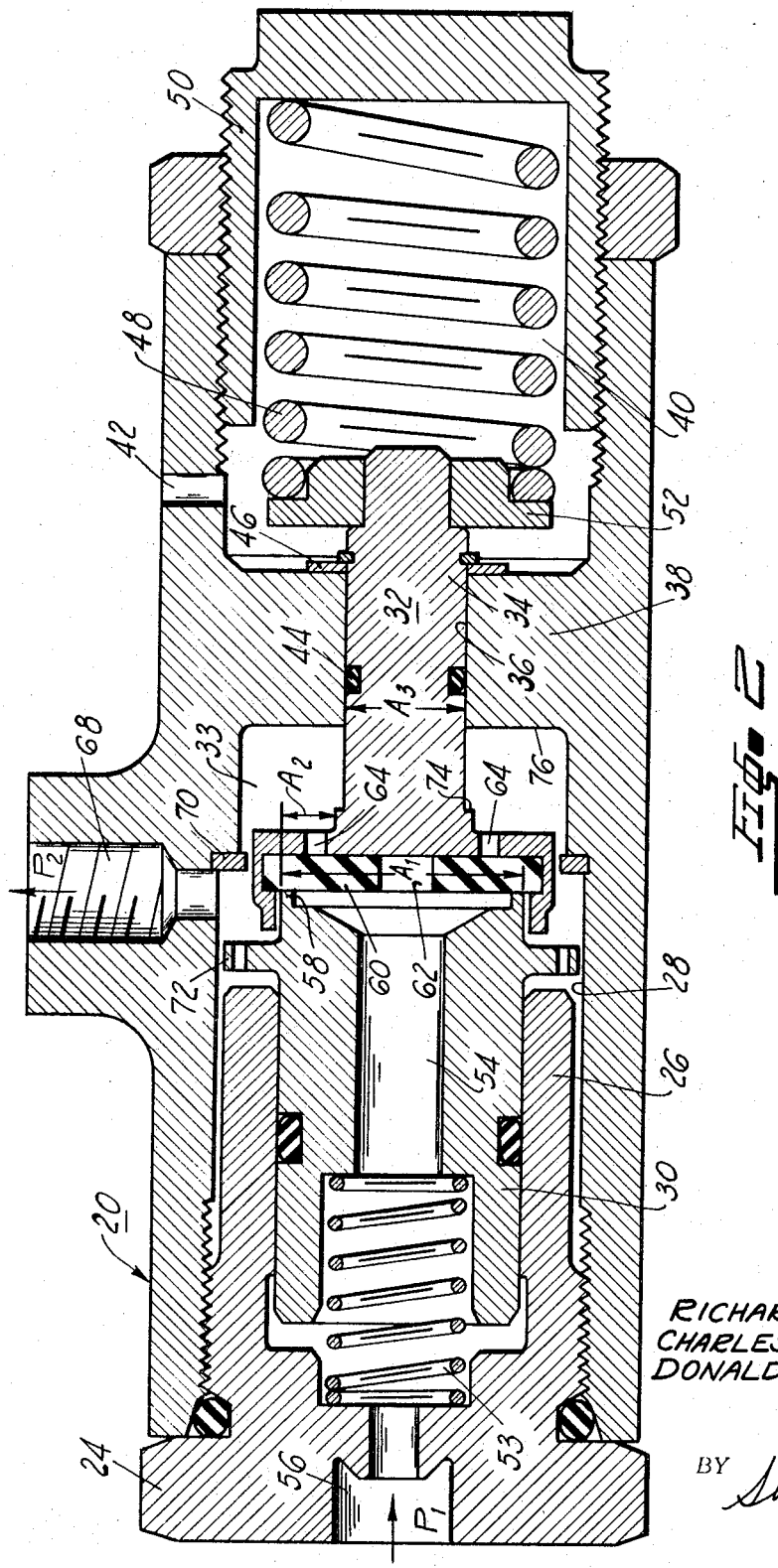

| United States Patent Office | 3,339,579 |
|---|---|
| | Patented Sept. 5, 1967 |

3,339,579
PRESSURE HOLD OFF VALVE
Richard L. Lewis, Charles M. Barnes, and Donald W. Smith, St. Joseph, Mich., assignors to The Bendix Corporation, a corporation of Delaware
Filed Aug. 27, 1965, Ser. No. 483,045
4 Claims. (Cl. 137—493.2)

This invention relates to a valve for holding off pressure communication to a set of brake assemblies until pressure generated by a pressure source builds up to a predetermined value.

The pressure hold off valve is especially designed for a brake system which includes a pair of front disk brake assemblies and a pair of rear drum brake assemblies. Only slight pressure is required to apply the disk brakes while a sizable pressure is required to overcome the return springs on the drum brakes before the brake shoes engage the brake drums.

It is therefore an object of this invention to provide a brake system with a pressure hold off valve which will not communicate pressure from a pressure generating source to the front disk brakes until the pressure has reached a predetermined value ensuring simultaneous braking of the front disk and rear drum brakes.

It is a further object of the invention to provide a pressure hold off valve which will also effect gradual buildup of pressure in the front disk brakes to equal the pressure at the pressure generating source once the pressure hold off valve effects communication between the pressure generating source and the front disk brakes.

Other objects of the invention will become apparent to those skilled in the art from the following description with reference to the drawings wherein:

FIGURE 2 is a sectional view of a pressure hold off valve; and

Figure 1:
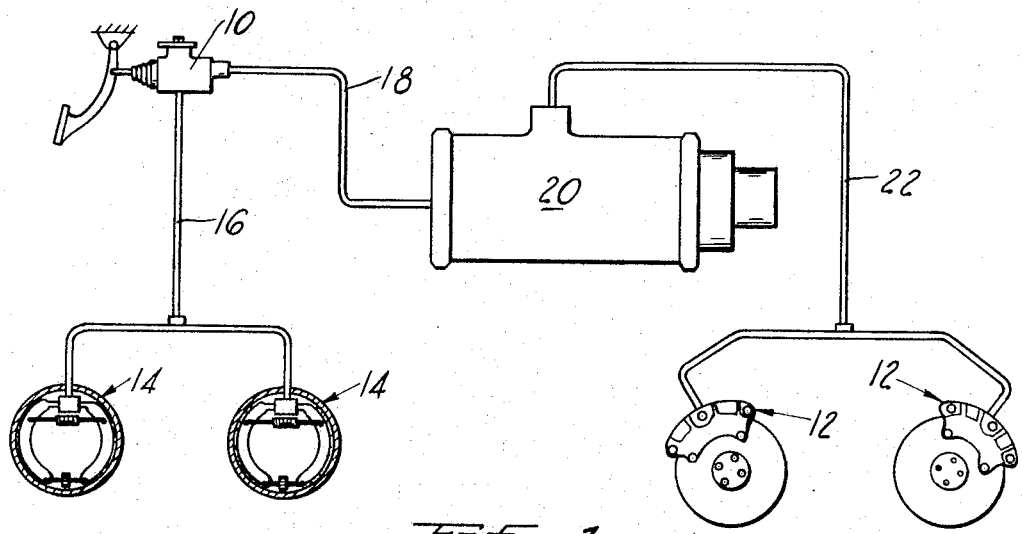
FIGURE 1 is a schematic view of a brake system.

Referring to FIGURE 1, a master cylinder 10 is provided for actuating a pair of front disc brakes 12 and a pair of rear brakes 14. A conduit 16 connects one actuating chamber of the master cylinder with the wheel cylinders of the rear brakes 14 and the conduit 18 connects the other actuating chamber of the master cylinder with a pressure hold off valve 20 which in turn is connected by a conduit 22 to the wheel cylinders of the front brakes 12.

An inlet fitting 24 is threadedly secured to one end of the valve housing 20 and has a tubular portion 26 extending into a bore 28 in the housing. A plunger 30 is slidably received in the tubular portion 26 and a plunger 32 is located in an outlet chamber 33 and has a stem 34 slidably received in an opening 36 in the end wall 38 of the bore 28. The stem 34 extends into a chamber 40 which is communicated to atmosphere by vent 42, and an O-ring 44 is secured to the stem 34 and seals the chamber 40 from the outlet chamber 33. A washer 46 is secured to the stem 34 for engagement with the wall 38 to limit movement of the plunger 32 to the left. A variable rate hold off spring 48 is compressed between a plug 50 and a retainer 52, carried by the stem 34, and acts on the plunger 32 to urge the same to the left.

The plunger 30 is biased to the right by a spring 53 and has an inlet passage 54 communicating directly with an inlet port 56 in the fitting 24. An annular lip 58 surrounds the inlet passage 54 and sealingly engages a rubber diaphragm 60 carried by the plunger 32. The diaphragm 60 has a port 62 and acts as a check valve by sealing off a pair of return ports 64 from the port 62 to prevent flow from the inlet passage 54 to the return ports 64 but allows flow in the opposite direction from return ports 64 to the inlet passage 54.

The return ports 64 are communicated to the outlet chamber 33 which in turn is communicated to an outlet port 68. A washer 70 is carried on the housing 20 and is engaged by a flange 72, carried by the plunger 30, when the plunger 30 moves to the right. A shoulder 74, carried by the plunger 32, will engage the surface 76 of the wall 38 upon movement of the plunger 32 to the right. The distance between flange 72 and washer 70 is less than the distance between the shoulder 74 and surface 76 in order that the plunger 32 will move further to the right than plunger 30 thereby effecting disengagement of the lip 58 and diaphragm 60.

The inlet pressure $P_1$ acts on the plunger 32 over an area designated by diameter $A_1$ to urge the same toward the left. The outlet pressure $P_2$ acts on the plunger 32 over an effective annular area $A_2$, which is equal to the difference in areas $(A_1-A_3)$, to urge the same to the left. The areas on plunger 30 that are exposed to inlet pressure $P_1$ which acts thereon in a direction to urge movement of the plunger 30 to the left or to the right are equal and accordingly, $P_1$ has no effect on plunger 30. Only the force of spring 53 effectively acts on the plunger 30 and this force maintains the annular lip 58 in engagement with the diaphragm 60.

*Operation*

Figure 3:
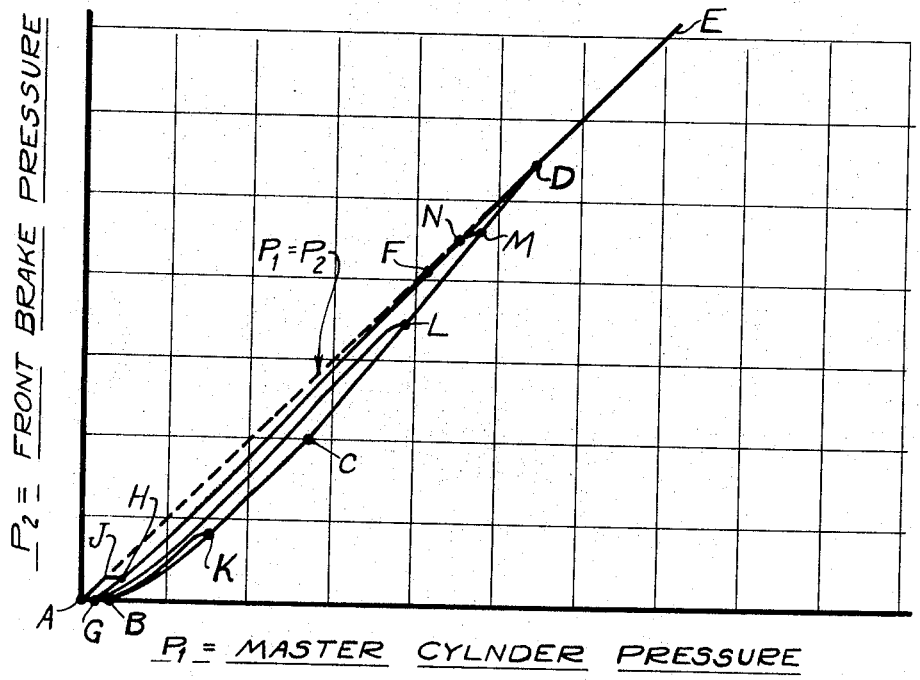
FIGURE 3 is a graph depicting the operation of the pressure hold off valve.

FIGURE 3 illustrates a typical pressure curve for the pressure hold off valve 20. The curve is referred to during the following operation description. The equations set forth do not consider friction which must be taken into account when designing the valve.

Upon actuation of the master cylinder 10, fluid under pressure $P_1$ will enter the pressure hold off valve 20 and will build up to a predetermined value wherein $P_1A_1$ equals the force $(F_s)$ of the hold off spring 48. Line A–B represents the pressure relationship between $P_1$ and $P_2$ during this stage. At this predetermined value, the plungers 32 and 30 will move as a unit to the right compressing fluid in outlet chamber 33 initiating pressure in the front brakes as illustrated by line B–C. The plungers 32 and 30 move to the right until flange 72 engages washer 70 stopping movement of plunger 30. At this point (C), the annular lip 58 and diaphragm 60 coact to meter fluid from inlet passage 54 to outlet chamber 33 (line C–D) until $P_1=P_2$ (Point D) wherein $P_1A_1=P_2A_2+F_s$ and plunger 32 moves to the right until the shoulder 74 engages surface 76 on wall 38 thereby opening unrestricted communication between inlet passage 54 and outlet chamber 33. From this point on, $P_2$ will equal $P_1$ as illustrated by line D–E.

Upon brake release, $P_2$ decreases at the same rate as $P_1$ (line E–D) with fluid passing from the outlet chamber 33 past the lip 58 to inlet passage 54 until $P_1A_3=F_s$ (point D) at which time spring 48 moves plunger 32 to the left and effects a sealing engagement between lip 58 and diaphragm 60. Fluid from chamber 33 is then communicated to inlet passage 54 through return ports 64 and out of the port 62 of the check valve diaphragm 60 (line D–F) until $P_1A_1=P_2A_2+F_s$ wherein the spring 48 effects movement of the plungers 32 and 30 to the left thereby expanding the outlet chamber 33 and decreasing $P_2$ at a greater rate than $P_1$ until $P_2$ reaches zero during stroking of the plungers 32 and 30 to the left as illustrated by line F–H–G. If washer 46 engages the wall 38 and thereby stops stroking of the plungers 32 and 30 before $P_2$ reaches zero (point H) then there will be a lag (line H–J) until $P_1$ reduces to equal $P_2$. Passage of fluid from outlet chamber 33 through passage 64 and pass the check valve 60 will occur when $P_1-P_2$ reduces to rezo as illustrated by line J–A.

If the brakes are released when the $P_1$, $P_2$ relationship lies on line B–C, then the pressure drop of $P_2$ will be effected by stroking of plungers 30 and 32 to the left and thereby expanding the volume of outlet chamber 33 (see line K–B). The same will be true if the brakes are released if the $P_1$, $P_2$ relationship lies on line D–C and $P_2$ is less than at point F (see line L–G). If the brakes are released when the $P_1$, $P_2$ relationship lies on line C–D and $P_2$ (point M) is greater than at point F, then the master cylinder pressure $P_1$ will decrease (line M–N) until $P_1=P_2$ at which time (point N) check valve 60 will open. The $P_1$, $P_2$ relationship thereafter will be along curve N, F, H, G, or curve N, F, H, J, A. It will be noted that in lines M–N, L–G and K–B, pressure $P_1$ initially drops more rapidly than pressure $P_2$. This is due to the fact that the pressure $P_1$ must drop so that the combined effect of $P_1$ and friction can be overcome by the combined effect of pressure $P_2$ and the spring force $F_s$ before the plungers can be moved to the left to effect a decrease in pressure $P_2$.

It can be seen from the chart that upon release of the braking pressure, pressure $P_2$ decreases practically at the same rate it increased upon brake application. In other words, the same pressure $P_1$ in the master cylinder upon either brake application or brake release will produce the same or substantially the same corresponding pressure $P_2$ at the front brakes.

From the above, it can readily be seen that the above objects are achieved by the invention disclosed herein. It is our intention to include within the scope of the following claims all equivalent applications of the invention whereby the same or substantially the same results may be obtained.

What is claimed is:

1. A pressure hold off device comprising:
a housing having a bore therein, a first valve member and a second valve member mounted in said bore for substantial slidable movement therein, said bore including an inlet chamber and an outlet chamber, said second valve member having a first effective area exposed to pressure in said outlet chamber, first passage means carried by said first valve member communicating a second effective area on said second valve member and said outlet chamber with said inlet chamber, said first effective area being so arranged that outlet pressure acting thereon will urge said second valve member in one direction and into engagement with said first valve member, said second effective area being greater than said first effective area and so arranged that inlet pressure acting thereon will urge said second valve member in the opposite direction, cooperating valve means on said valve members effective to cut off communication between said first passage means and said outlet chamber in closed position when said valve members engage each other and to communicate said inlet and outlet chambers in open position when said valve members are disengaged from each other, second passage means communicating said outlet chamber to said inlet chamber, check valve means located in said second passage means constructed to allow flow only from said outlet chamber to said inlet chamber, first stop means, first resilient means urging said second valve member in said one direction against said first stop means, second resilient means weaker than said first resilient means urging said first valve member in said opposite direction into engagement with said second valve member, second stop means, abutment means carried by said first valve member for engagement with said second stop means, third stop means, abutment means on said second valve member for engaging said third stop means, said valve members being so constructed that when said second valve member is against said first stop means said abutment means on said valve members are spaced in said one direction from their respective stop means with said abutment means on said second valve member being spaced further away from said third stop means than said abutment means on said first valve member is spaced from said second stop means, said valve members and said outlet chamber being so constructed and arranged to define a decreasing chamber when said valve members are moved in said opposite direction against the force of said first resilient means.

2. The structure as recited in claim 1 wherein said second passage means is located in said second valve member, said check valve means is carried by said second valve member and exposed to said first passage means, said second passage means being communicated to said first passage means when said check valve means allows flow therepast.

3. The structure as recited in claim 2 wherein said check valve means comprises a resilient member carried on one end of said second valve member, said second valve member having port means communicating said second passage means to said resilient member, said resilient member having port means communicated to said first passage means offset from said second valve member port means for communicating said second passage means to said first passage means, said resilient member being so arranged that it is pressed by inlet pressure against said one end of said second valve member cutting off communication between said port means.

4. The structure as recited in claim 3, wherein said cooperating valve means on said valve members comprises an annular edge on one end of said first valve member and said resilient member, said annular edge surrounding said port means and engageable with said resilient member to cut off communication between said first passage means and said outlet chamber.

References Cited

UNITED STATES PATENTS 2,137,882  11/1939  Nelson _____ 137—493 X

FOREIGN PATENTS 925,168  3/1947  France.
756,213  8/1956  Great Britain.

WILLIAM F. O'DEA, *Primary Examiner.*

H. W. WEAKLEY, *Assistant Examiner.*